US007513443B2

(12) United States Patent

Escoto, Jr. et al.

(10) Patent No.: US 7,513,443 B2

(45) Date of Patent: *Apr. 7, 2009

(54) PRESSURIZED LIQUID SUPPLY ASSEMBLY

(75) Inventors: John I. Escoto, Jr., St. Paul, MN (US); Daniel E. Siltberg, White Bear Township, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 347 days.

This patent is subject to a terminal disclaimer.

(21) Appl. No.: 11/348,677

(22) Filed: Feb. 7, 2006

(65) Prior Publication Data

US 2006/0175434 A1 Aug. 10, 2006

Related U.S. Application Data

(63) Continuation-in-part of application No. 11/053,085, filed on Feb. 8, 2005, now Pat. No. 7,410,106.

(51) Int. Cl.
*B01D 17/00* (2006.01)
*B05B 1/30* (2006.01)

(52) U.S. Cl. ....................... 239/328; 239/302; 239/309; 239/327; 239/392; 239/318; 222/95; 222/93; 215/11.1

(58) Field of Classification Search ................. 239/302, 239/309, 318, 346, 327, 328, 562; 222/95, 222/83, 105, 104; 220/403; 215/11.1
See application file for complete search history.

(56) References Cited

U.S. PATENT DOCUMENTS

| | | | |
|---|---|---|---|
| 1,488,125 | A | 3/1924 | Kline |
| 1,710,435 | A | 4/1929 | Shelburne |
| 3,090,530 | A | 5/1963 | Peeps |
| 3,199,438 | A | 8/1965 | Hultgren |
| 3,227,305 | A | 1/1966 | Enssle |
| 3,236,459 | A | 2/1966 | McRitchie |
| 3,270,920 | A | 9/1966 | Nessler |
| 3,773,211 | A | 11/1973 | Bridgman |
| 3,773,571 | A | 11/1973 | Rupprecht et al. |
| 3,934,746 | A | 1/1976 | Lilja |
| 4,043,510 | A | 8/1977 | Morris |
| 4,162,030 | A | 7/1979 | Capra et al. |
| 4,174,071 | A | 11/1979 | Lau et al. |
| 4,322,020 | A | 3/1982 | Stone |

(Continued)

FOREIGN PATENT DOCUMENTS

| | | |
|---|---|---|
| DE | 89 03 436 | 6/1989 |

(Continued)

OTHER PUBLICATIONS

U.S. Application entitled "Liquid Supply Assembly", filed on Feb. 8, 2005, having U.S. Appl. No. 11/053,085.

*Primary Examiner*—Len Tran
*Assistant Examiner*—James S Hogan
(74) *Attorney, Agent, or Firm*—Pamela L. Stewart

(57) ABSTRACT

A liquid supply assembly is disclosed. The liquid supply assembly may be used in combination with a spraying device or spray gun to apply liquid to a substrate. The liquid supply assembly is particularly suitable for use in systems utilizing pressurized liquid containers.

19 Claims, 9 Drawing Sheets

U.S. PATENT DOCUMENTS

| | | | | | |
|---|---|---|---|---|---|
| 4,434,810 | A | | 3/1984 | Atkinson | |
| 4,930,644 | A | | 6/1990 | Robbins, III | |
| 5,069,389 | A | | 12/1991 | Bitsakos | |
| 5,119,992 | A | | 6/1992 | Grime | |
| 5,123,571 | A | * | 6/1992 | Rebeyrolle et al. | 222/105 |
| 5,236,128 | A | * | 8/1993 | Morita et al. | 239/407 |
| 5,328,095 | A | | 7/1994 | Wickenhauer | |
| 5,415,352 | A | | 5/1995 | May | |
| 5,816,501 | A | | 10/1998 | LoPresti et al. | |
| 6,036,114 | A | | 3/2000 | Shih | |
| 6,536,687 | B1 | * | 3/2003 | Navis et al. | 239/345 |
| 6,588,681 | B2 | * | 7/2003 | Rothrum et al. | 239/328 |
| 6,820,824 | B1 | | 11/2004 | Joseph et al. | |
| 6,938,836 | B2 | * | 9/2005 | Bouic | 269/346 |
| 7,086,549 | B2 | * | 8/2006 | Kosmyna et al. | 220/23.87 |
| 2006/0175433 | A1 | * | 8/2006 | Escoto et al. | 239/302 |

FOREIGN PATENT DOCUMENTS

| | | | |
|---|---|---|---|
| DE | 297 05 779 | | 6/1997 |
| EP | 0 847 809 | | 6/1998 |
| JP | 07-251102 | | 10/1995 |
| KR | 2003-0091487 | | 12/2003 |
| WO | WO 98/32539 | | 7/1998 |
| WO | WO 2004/012800 | A1 | 2/2004 |
| WO | WO 2004/037431 | A1 | 5/2004 |

* cited by examiner

PRESSURIZED LIQUID SUPPLY ASSEMBLY

CROSS-REFERENCE TO RELATED APPLICATIONS

This application is a continuation-in-part of U.S. patent application Ser. No. 11/053,085, filed Feb. 8, 2005, now U.S. Pat. No. 7,410,106 entitled "LIQUID SUPPLY ASSEMBLY", the subject matter of which is hereby incorporated by reference.

FIELD OF THE INVENTION

The present invention relates to liquid supply components and assemblies. The liquid supply components and assemblies are particularly suitable in pressurizable liquid supply assemblies for use with liquid (e.g., paint) spraying devices or spray guns.

BACKGROUND OF THE INVENTION

Various liquid supply assemblies have been described for use with liquid (e.g., paint) spraying devices or spray guns, including those described in International Publication Number WO 98/32539 (Joseph et al.) published on Jul. 30, 1998, U.S. Pat. No. 6,536,687 (Navis et al.), U.S. Pat. No. 6,588,681 (Rothrum et al.), the content of all of which is incorporated herein by reference. The supply assemblies include a number of components such as a mixing cup or container, a collapsible liner, a lid, an adapter for attaching a portion of the lid to a component of a spraying device, and a filter element.

While the prior art discloses various liquid supply assemblies for use in spray devices, many of the liquid supply assemblies are only suitable for relatively low pressure systems, namely, systems using a container pressure of less than about 69.0 kilopascals (kPa) (10 pounds per square inch (psi)). Such low pressure systems have shortcomings including, but not limited to, difficulty spraying highly viscous fluids such as some paints, adhesives, and the like.

There remains a need in the art for liquid supply components and assemblies suitable for use in pressurizable liquid supply assemblies for high pressure applications, namely, systems using a container pressure of greater than about 69.0 kPa (10 psi).

SUMMARY OF THE INVENTION

The present invention is directed to liquid supply assemblies for spraying devices and specific components thereof. The liquid supply assemblies comprise a number of components that enable high pressure spray applications using container pressures above about 69.0 kPa (10 psi).

The liquid supply assemblies of the present invention provide flexibility to a user with regard to types of fluids to apply via a spray device. For example, fluids having a higher viscosity may be sprayed using the liquid supply assemblies of the present invention. Further, various components of the liquid supply assemblies of the present invention may be used as components in existing liquid supply assemblies when a higher pressure system is desired.

Accordingly, the present invention is directed to liquid supply assemblies capable of withstanding container pressures greater than about 69.0 kPa (10 psi). In one exemplary embodiment, the liquid supply assembly comprises (a) a container; (b) a lid having one or more lid components capable of connecting to (i) a liquid spraying device or (ii) an adapter capable of connecting to the liquid spraying device, the one or more lid components being positioned on an upper surface of the lid; (c) and a collapsible liner capable of fitting within the container; wherein the container, the lid, and the collapsible liner form a pressurizable assembly capable of withstanding a container pressure of at least about 69.0 kiloPascals (kPa) (10 pounds per square inch (psi)). The collapsible liner may comprise a separate assembly component or may comprise a container component integrally attached to the container. The exemplary liquid supply assembly is capable of being connected to a liquid spraying device, and withstanding a container pressure above about 69.0 kPa (10 psi), and in some embodiments, above about 137.9 kPa (20 psi).

In a further exemplary embodiment, the liquid supply assembly comprises (a) a container having (i) at least one container side wall, (ii) a container bottom wall, (iii) a first set of mechanical features capable of engaging with a second set of mechanical features on a lid, an optional shroud component or an optional collar, and (iv) an air inlet within the at least one container side wall or the container bottom wall; (b) a collapsible liner capable of fitting within the container; (c) a lid having one or more lid components capable of connecting to (i) a liquid spraying device or (ii) an adapter capable of connecting to the liquid spraying device, the one or more lid components being positioned on an upper surface of the lid; and (d) at least one pressure relief valve within the liquid supply assembly, said at least one pressure relief valve being capable of (i) preventing fluid from exiting the liquid supply assembly when a system pressure within said container is less than a threshold amount, and (ii) allowing fluid to exit the liquid supply assembly when the system pressure within said container is greater than or equal to the threshold amount, wherein the container, the collapsible liner, and the lid form a pressurizable assembly capable of withstanding a container pressure of at least about 69.0 kiloPascals (kPa) (10 pounds per square inch (psi)).

The present invention is further directed to specific components that may be used in a liquid supply assembly. In one exemplary embodiment, the present invention is directed to a container component suitable for use in a liquid supply assembly, wherein the container component comprises at least one container side wall; a container bottom wall; a container top end having a container opening therein; a first set of mechanical features extending along the at least one container side wall proximate the top end, said first set of mechanical features being capable of engaging with a second set of mechanical features on a lid, an optional shroud component or an optional collar of the liquid supply assembly; an air inlet within the at least one container side wall proximate the container bottom wall; and a plurality of air distribution fins extending along an upper surface of the container bottom wall. The exemplary container may further comprise one or more pressure relief areas within the container bottom wall. In addition, one or more of the air distribution fins may extend upward from the container bottom wall along at least a portion of the at least one container side wall proximate the bottom wall.

In a further exemplary embodiment, the container component suitable for use in a liquid supply assembly comprises at least one container side wall; a container bottom wall; a first set of mechanical features capable of engaging with a second set of mechanical features on a lid, an optional shroud component or an optional collar of the liquid supply assembly; an air inlet within said at least one container side wall or said container bottom wall; and at least one pressure relief valve within said at least one container side wall or said container bottom wall, said at least one pressure relief valve being capable of (i) preventing fluid from exiting said container when a system pressure within said container is less than a threshold amount, and (ii) allowing fluid to exit said container when the system pressure within said container is greater than or equal to the threshold amount.

The specific components of the present invention may be used in liquid supply assemblies of the present invention, as well as known liquid supply assemblies. In one exemplary embodiment of the present invention, a liquid supply assembly comprises (a) a container having at least one container side wall, a container bottom wall, a container top end having a container opening therein, a first set of mechanical features along the at least one container side wall proximate the top end, an air inlet within the at least one container side wall proximate the bottom wall, and a plurality of air distribution fins extending along an upper surface of the container bottom wall; (b) a lid having a first end and a second end opposite the first end, an upper surface and a lower surface both of which extend from the first end to the second end, an opening extending through a portion of the lid from the first end to the second end, a lid rim extending along a periphery of the lid, and one or more lid components capable of connecting to (i) a liquid spraying device or (ii) an adapter capable of connecting to the liquid spraying device, the one or more lid components being positioned on the upper surface of the lid; (c) an optional shroud having a first shroud end, a second shroud end opposite the first shroud end, an upper shroud surface and a lower shroud surface both of which extend from the first shroud end to the second shroud end, a shroud opening in the second shroud end, said shroud opening being sized to enable the one or more lid components to extend through the shroud opening, and a shroud ledge extending along an outer periphery of the shroud; and (d) an optional collar capable of engaging with the container, said collar comprising a top end having a collar opening therein, a bottom end, at least one collar side wall extending between the top end and the bottom end, a collar rim extending along the top end and protruding into the collar opening, and a second set of mechanical features along the at least one collar side wall, the second set of mechanical features being capable of engaging with the first set of mechanical features on the container; wherein the container, the lid, the optional shroud, and the optional collar form a pressurizable assembly capable of withstanding a container pressure of at least about 69.0 kPa (10 psi).

In a further exemplary embodiment, specific components of the present invention may be used to form a liquid supply assembly comprising (a) a container having (i) at least one container side wall, (ii) a container bottom wall, (iii) a first set of mechanical features capable of engaging with a second set of mechanical features on a lid, an optional shroud component or an optional collar, and (iv) an air inlet within the at least one container side wall or the container bottom wall; (b) a collapsible liner capable of fitting within the container; (c) a lid having a first end and a second end opposite the first end, an upper surface and a lower surface both of which extend from the first end to the second end, an opening extending through a portion of the lid from the first end to the second end, a lid rim extending along a periphery of the lid, and one or more lid components capable of connecting to (i) a liquid spraying device or (ii) an adapter capable of connecting to the liquid spraying device, the one or more lid components being positioned on the upper surface of the lid; (d) an optional shroud having a first shroud end, a second shroud end opposite the first shroud end, an upper shroud surface and a lower shroud surface both of which extend from the first shroud end to the second shroud end, a shroud opening in the second shroud end, said shroud opening being sized to enable the one or more lid components to extend through the shroud opening, and a shroud ledge extending along an outer periphery of the shroud; (e) an optional collar capable of engaging with the container, said collar comprising a top end having a collar opening therein, a bottom end, at least one collar side wall extending between the top end and the bottom end, a collar rim extending along the top end and protruding into the collar opening, and a second set of mechanical features along the at least one collar side wall, the second set of mechanical features being capable of engaging with the first set of mechanical features on the container; and (f) at least one pressure relief valve within the liquid supply assembly, said at least one pressure relief valve being capable of (i) preventing fluid from exiting the liquid supply assembly when a system pressure within said container is less than a threshold amount, and (ii) allowing fluid to exit the liquid supply assembly when the system pressure within said container is greater than or equal to the threshold amount, wherein the container, the lid, the optional shroud, and the optional collar form a pressurizable assembly capable of withstanding a container pressure of at least about 69.0 kiloPascals (kPa) (10 pounds per square inch (psi)).

The present invention is also directed to method of making and using liquid supply assemblies suitable for use on a liquid spraying device. In one exemplary embodiment, the method of making a liquid supply assembly comprises the steps of (a) forming a container, wherein the container comprises (i) at least one container side wall, (ii) a container bottom wall, (iii) a first set of mechanical features capable of engaging with a second set of mechanical features on a lid, an optional shroud component or an optional collar, (v) an air inlet within the at least one container side wall proximate the bottom end, and (vi)(i) a plurality of air distribution fins extending along an upper surface of the container bottom end, (vi)(ii) at least one pressure relief valve within the container, the at least one pressure relief valve being capable of (i) preventing fluid from exiting the container when a system pressure within the container is less than a threshold amount, and (ii) allowing fluid to exit the container when the system pressure within the container is greater than or equal to the threshold amount, or both (vi)(i) and (vi)(ii); and (b) combining the container with one or more additional components to form a pressurizable liquid supply assembly. The exemplary method of making a liquid supply assembly may further comprise one or more additional steps.

In a further exemplary embodiment, the method of making a liquid supply assembly comprises the step of: (a) providing a lid component having one or more lid components capable of connecting to (i) a liquid spraying device or (ii) an adapter capable of connecting to the liquid spraying device, the one or more lid components being positioned on an upper surface of the lid component; (b) providing an optional shroud component having a shape complementary to the lid component such that the one or more lid components extend through an opening in the shroud component; (c) providing a container; (d) providing a collapsible liner capable of fitting within the container and engaging with the lid component; (e) providing an optional collar component; and (f) assembling the container, the liner, the lid component, the optional shroud component, and the optional collar component with one another to form a pressurizable liquid supply assembly.

The present invention is even further directed to spraying devices comprising any of the liquid supply assemblies or specific components that may be used in a liquid supply assembly.

These and other features and advantages of the present invention will become apparent after a review of the following detailed description of the disclosed embodiments and the appended claims.

BRIEF DESCRIPTION OF THE DRAWINGS

The present invention may be more completely understood in consideration of the following detailed description of various embodiments of the invention in connection with the accompanying drawings, wherein like reference numerals refer to like parts in the several views, and wherein.

DETAILED DESCRIPTION OF THE INVENTION

To promote an understanding of the principles of the present invention, descriptions of specific embodiments of the invention follow and specific language is used to describe the specific embodiments. It will nevertheless be understood that no limitation of the scope of the present invention is intended by the use of specific language. Alterations, further modifications, and such further applications of the principles of the present invention discussed are contemplated as would normally occur to one ordinarily skilled in the art to which the invention pertains.

The present invention is directed to liquid supply assemblies for spraying devices, as well as individual components within the liquid supply assemblies. In an embodiment, individual components for use in a pressurized liquid supply assembly are disclosed, wherein the individual components comprise (i) a container capable of withstanding a relatively high air pressure (e.g., greater than about 69.0 kPa (10 psi), and in some cases as much or greater than about 137.9 kPa (20 psi)), (ii) a lid component of the assembly, (iii) an optional shroud that may be used to reinforce the lid component of the assembly, and (iv) an optional collar for connecting the lid component and the optional shroud to the container. The individual components of the present invention may be used in a variety of liquid supply assemblies, including, but not limited to, those described herein, as well as those disclosed in International Publication Number WO 98/32539 (Joseph et al.), U.S. Pat. No. 6,536,687 (Navis et al.), and U.S. Pat. No. 6,588,681 (Rothrum et al.).

Figure 1:
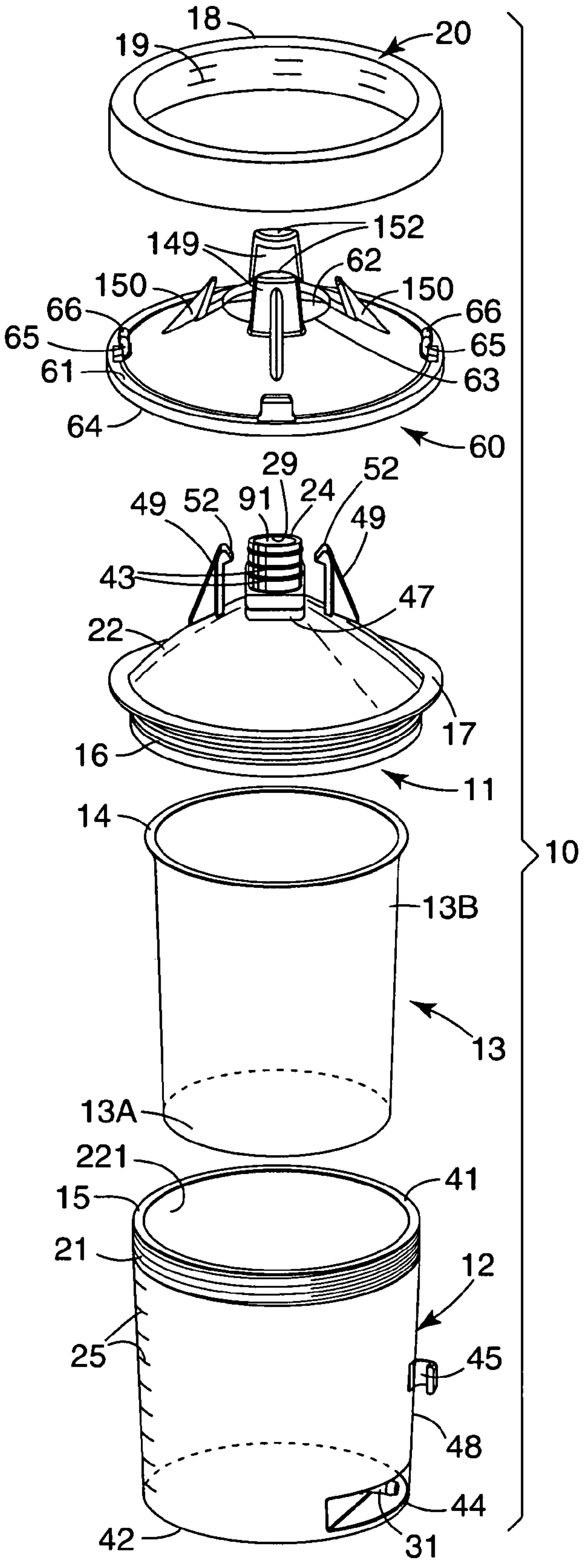
FIG. 1 is an exploded perspective view of an exemplary liquid supply assembly according to the present invention.

An exemplary liquid supply assembly of the present invention is provided in FIG. 1. As shown in FIG. 1, exemplary liquid supply assembly 10 comprises lid component 11, container 12, liner 13, shroud 60, and collar 20. In this embodiment, liner 13 fits inside container 12 such that liner rim 14 of liner 13 rests on upper container surface 15 of container 12. Lower portion 16 of lid component 11 extends snugly into liner 13 until a lower surface of lid rim 17 comes into contacts with liner rim 14. Shroud 60 fits over lid component 11 so that a lower surface of shroud rim 61 comes into contacts with an upper surface of lid rim 17. Shroud opening 62 enables portions of lid component 11 (described below) to extend through shroud 60 so that lid component 11 can connect to a spraying device (not shown) or an adapter for connecting to a spraying device (not shown). Collar 20 is used to secure shroud 60 and lid component 11 in place by engaging collar threads 19 positioned on an inner surface of collar 20 with container threads 21 positioned on an outer surface of container 12 below upper container surface 15. When screwed tightly, a lower surface of upper rim 18 of collar 20 is in contact with an upper surface of shroud rim 61.

As shown in FIG. 1, exemplary liquid supply assembly 10 of the present invention may comprise a number of components. A description of individual components and methods of using individual components alone or in combination is provided below.

I. Liquid Supply Assembly Components

The liquid supply assemblies disclosed herein may comprise one of more of the following components.

A. Container

The liquid supply assemblies disclosed herein comprise a container, such as exemplary container 12 of exemplary liquid supply assembly 10. In an embodiment, the container typically has at least one container side wall, a container bottom end, a container top end having a container opening therein, and a first set of threads extending along the at least one container side wall. The container further comprises an air inlet along a surface of the container. The air inlet allows air to enter the container from an air source in order to pressurize the container interior.

As shown in FIG. 1, exemplary container 12 comprises a generally cylindrical side wall 48 having top and bottom ends 41 and 42, a bottom wall 44 extending across and closing bottom end 42 of side wall 48, and an upper surface 15 extending around top end 41 of side wall 48. Top end 41 of side wall 48 defines an opening into container 12. Side wall 48 may bear indicia 25, for example, indicating the levels to which one or more liquids should be sequentially poured into liner 13 positioned within container 12 to provide a predetermined ratio between one or more liquids. In an embodiment, side wall 48 is sufficiently transparent to enable viewing of the liquid level in liner 13 positioned within container 12 through side wall 48, which assists a person in adding liquids to the desired levels indicated by indicia 25. Side wall 48 may also bear other types of indicia, such as trademarks, brand names and the like.

Figure 2:
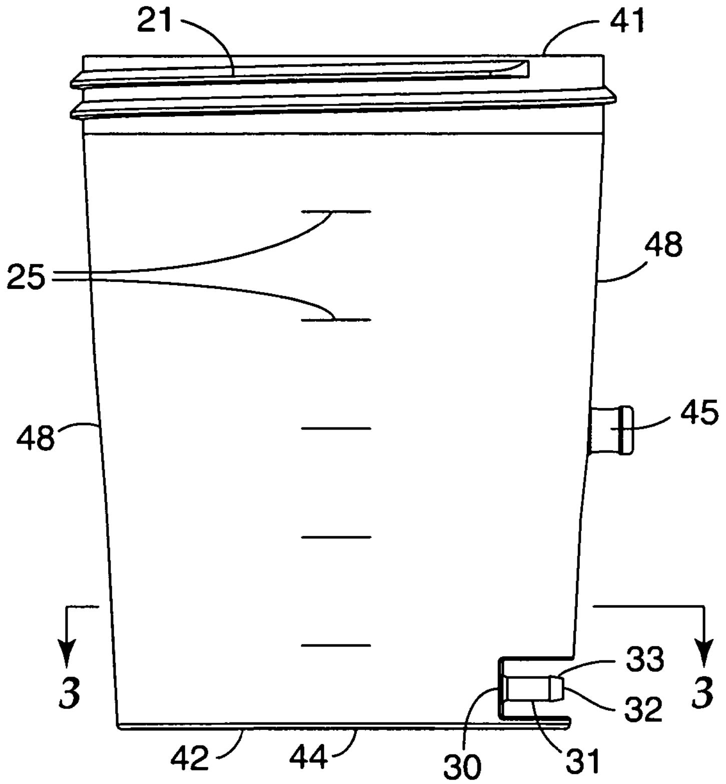
FIG. 2 is an exploded side view of the exemplary container in the exemplary liquid supply assembly shown in FIG. 1.

Exemplary container 12 further comprises air inlet 30 in side wall 48 (see FIG. 2). Surrounding air inlet 30 and extending outward from a portion of side wall 48 is air inlet fitting 31, suitable for connecting to an air hose (not shown). Typically, air inlet fitting 31 is integrally connected to container 12. For example, in one desired embodiment, air inlet fitting 31 is an integrally connected molded component of container 12. FIG. 2 provides an exploded side view of exemplary container 12 and some of its features.

As shown in FIG. 2, exemplary container 12 comprises air inlet 30 within side wall 48, and air inlet fitting 31 extending outward from side wall 48. Air inlet fitting 31 comprises a bore 32 extending through air inlet fitting 31. Further, air inlet fitting 31 comprises fitting end 33 suitable for connecting to an air hose (not shown). Exemplary container 12 also comprises hose retaining clip 45 extending from side wall 48. Hose retaining clip 45 may be used to control movement of an air hose (not shown) connected to air inlet fitting 31 and extending to an air source.

Figure 3:
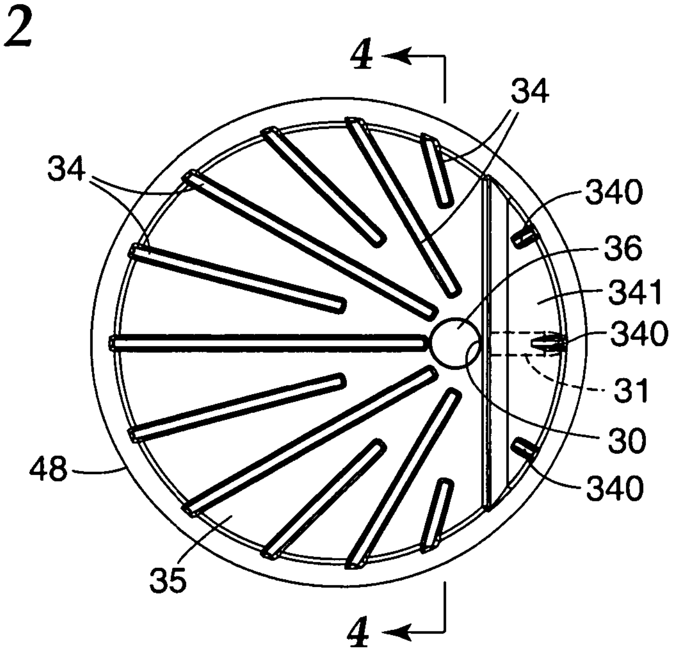
FIG. 3 is a cross-sectional view of the exemplary container component of FIG. 2 along line 3-3 shown in FIG. 2.

The container may further comprise one or more additional features such as those shown in FIG. 3. FIG. 3 provides a cross-sectional view of exemplary container 12 along line 3-3 shown in FIG. 2. In this exemplary embodiment, container 12 further comprises a plurality of air distribution fins 34 along an upper surface 35 of bottom wall 44. Air distribution fins 34 provide improved air flow and distribution along upper surface 35 of bottom wall 44. The resulting air flow and distribution within container 12 causes a more uniform and distributed force pushing on a lower surface of a collapsible liner positioned within container 12. The uniform and distributed force causes the liner to collapse more evenly as liquid exits the collapsible liner.

The number, size, shape and configuration of air distribution fins 34 along upper surface 35 of bottom wall 44 may vary depending on a number of factors including, but not limited to, the size of the container, the configuration of the liner, the air pressure within the container, and the type of liquid to be sprayed. As shown in FIG. 3, air distribution fins 34 extend radially from air inlet 30, and are distributed across upper surface 35. In an exemplary embodiment, each of air distribution fins 34 has a width ranging from about 1.0 mm (0.04 in) to about 5.0 mm (0.2 in), a height ranging from about 5.0 mm (0.2 in) to about 20.0 mm (0.8 in), and a length ranging from about 10.0 mm (0.4 in) to a length equal to or greater than the diameter of the container, typically up to about 75 mm (3.0 in).

Each of the air distribution fins 34 along upper surface 35 of bottom wall 44 may have a similar shape or may have a shape that varies from one fin to another. Typically, each of the air distribution fins 34 has a similar cross-sectional shape. The cross-sectional shape may be relatively simple, such as a rectangular cross-sectional shape, having two cross-sectional dimensions, namely a height and a width, wherein each of the height and the width remains substantially constant along a length of a given air distribution fin. Alternatively, the cross-sectional shape may be more complex. For example, each of the air distribution fins 34 may have a cross-sectional shape having a height and a width, wherein (i) the height and/or the width changes along a length of a given air distribution fin, (ii) the width changes along the height of a given air distribution fin, or both (i) and (ii). In one exemplary embodiment, one or more of the air distribution fins 34 have a pillar cross-sectional shape, wherein the cross-sectional width of the fin is greater at the base of the fin and at a top end of the fin than in a central portion of the fin.

Exemplary container 12 may further comprise one or more rest members 340 positioned along ledge 341 as shown in FIG. 3. Rest members 340 provide support for an optional indicating sheet (not shown) that may be positioned within container 12 to assist a user when filling container 12 with one or more liquids (described below). Like air distribution fins 34 described above, the number, size, shape and configuration of rest members 340 along ledge 341 may vary. Typically, rest members 340 have a height such that an upper surface of rest members 340 is positioned substantially within a horizontal plane containing an upper surface of one or more of air distribution fins 34.

In addition, exemplary container 12 may further comprise one or more pressure relief areas 36 within upper surface 35 of bottom wall 44. Pressure relief areas 36 provide an additional safety feature to the liquid supply assembly of the present invention. When the pressure within container 12 exceeds a desired level, pressure relief areas 36 break open to the atmosphere, causing the pressure within container 12 to drop immediately. By having pressure relief areas 36 within upper surface 35 of bottom wall 44, any air stream leaving container 12 will be directed downward away from a collapsible liner within container 12, and away from a person using the liquid supply assembly.

Pressure relief areas 36 may comprise any container feature that vents container 12 when the container pressure within container 12 exceeds a desired level. Suitable pressure relief features include, but are not limited to, deliberately weakened areas within upper surface 35 of bottom wall 44 (e.g., a thinner wall thickness), a pop-off valve, and a plug that pops out of container 12 at a threshold pressure level. In one embodiment of the present invention, pressure relief areas 36 comprise one or more deliberately weakened areas having a relatively thin wall thickness compared to the wall thickness of bottom wall 44. This embodiment is shown in FIG. 4.

Figure 4:
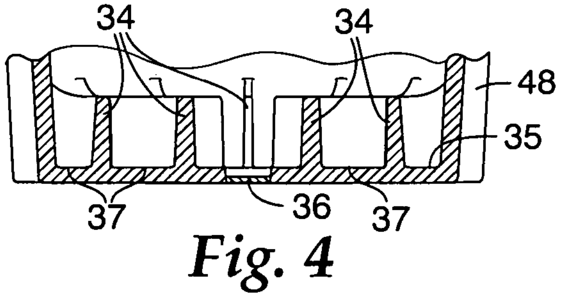
FIG. 4 is a cross-sectional view of a bottom wall of exemplary container component of FIG. 2 shown along line 4-4 shown in FIG. 3.

FIG. 4 provides a cross-sectional view of upper surface 35 of bottom wall 44 along line 4-4 shown in FIG. 3. As shown in FIG. 4, pressure relief areas 36 have a wall thickness less than other areas 37 within upper surface 35 of bottom wall 44. For example, the wall thickness in pressure relief areas 36 may be about 2.5 mm (0.10 in) while the wall thickness in other areas 37 may be about 5.0 mm (0.20 in).

Container 12 may be formed from a plastic material, for example, polyethylene, polypropylene or polyamide (e.g., nylon), and may be transparent, translucent (as shown in FIG. 1) or opaque, and of any suitable size. For use with a paint spray gun, containers typically have a capacity of about 150, 500 or 1000 ml, although other sizes are possible.

Container 12 has a wall thickness suitable for higher pressure systems. Typically, each wall (e.g., side wall 48, bottom wall 44) has a wall thickness of at least 3.0 mm (0.12 in) in order to provide sufficient structural strength for higher pressure systems.

As shown in FIG. 1, exemplary container 12 comprises container threads 21 positioned on an outer surface of container 12 below upper container surface 15. Container threads 21 are positioned to be engaged with corresponding threads on at least one of the following components: a lid component, a shroud component, and a collar component (all of which are described below). It should be noted that although exemplary container 12 comprises container threads 21 positioned on an outer surface of container 12 below upper container surface 15, container threads 21 may alternatively located on an inner side wall surface 221 below upper container surface 15 (see, for example, exemplary container 512 in FIG. 5 with container threads 521 on inner surface 518 of exemplary container 512). In this alternative embodiment, corresponding threads on at least one of the lid component, the shroud component, or the collar component engage with the container threads such that side wall 13B of liner 13 (described below) is positioned between the engaged set of threads (see, for example, exemplary liquid supply system 500 in FIG. 5).

It should be further noted that any other mechanical features may be used in place of exemplary container threads 21 shown in FIG. 1 (or exemplary container threads 521 shown in FIG. 5) to engage container 12 with at least one of the lid component, the shroud component, and the collar component. Suitable mechanical features that may be used instead of threads include, but are not limited to, cams, lugs, latches, any locking mechanism, etc.

B. Liner

The liquid supply assemblies disclosed herein may further comprise a separate liner, such as liner 13 of exemplary liquid supply assembly 10. The liner desirably has at least one liner side wall, a liner bottom end, a liner top end having a liner opening therein, and a liner rim extending along and protruding from the liner top end. The liner functions as a reservoir capable of containing one or more liquids.

As shown in FIG. 1, exemplary liner 13 has an outer shape similar to the interior of container 12 and has a liner rim 14 at the open end, which is capable of resting on upper container surface 15. Liner 13 is desirably self-supporting and collapsible. In one exemplary embodiment, liner 13 has a comparatively rigid base 13A and comparatively thin side walls 13B so that, when liner 13 collapses, liner 13 collapses in the longitudinal direction by virtue of the side walls collapsing rather than the base.

While the liner may be formed of any suitable material, in an embodiment, liner 13 comprises a polymeric material, such as polypropylene or polyethylene, and is formed from a molding process such as a thermoforming process. In one embodiment of the present invention, liner 13 comprises thermoformed low density polyethylene.

Figure 5:
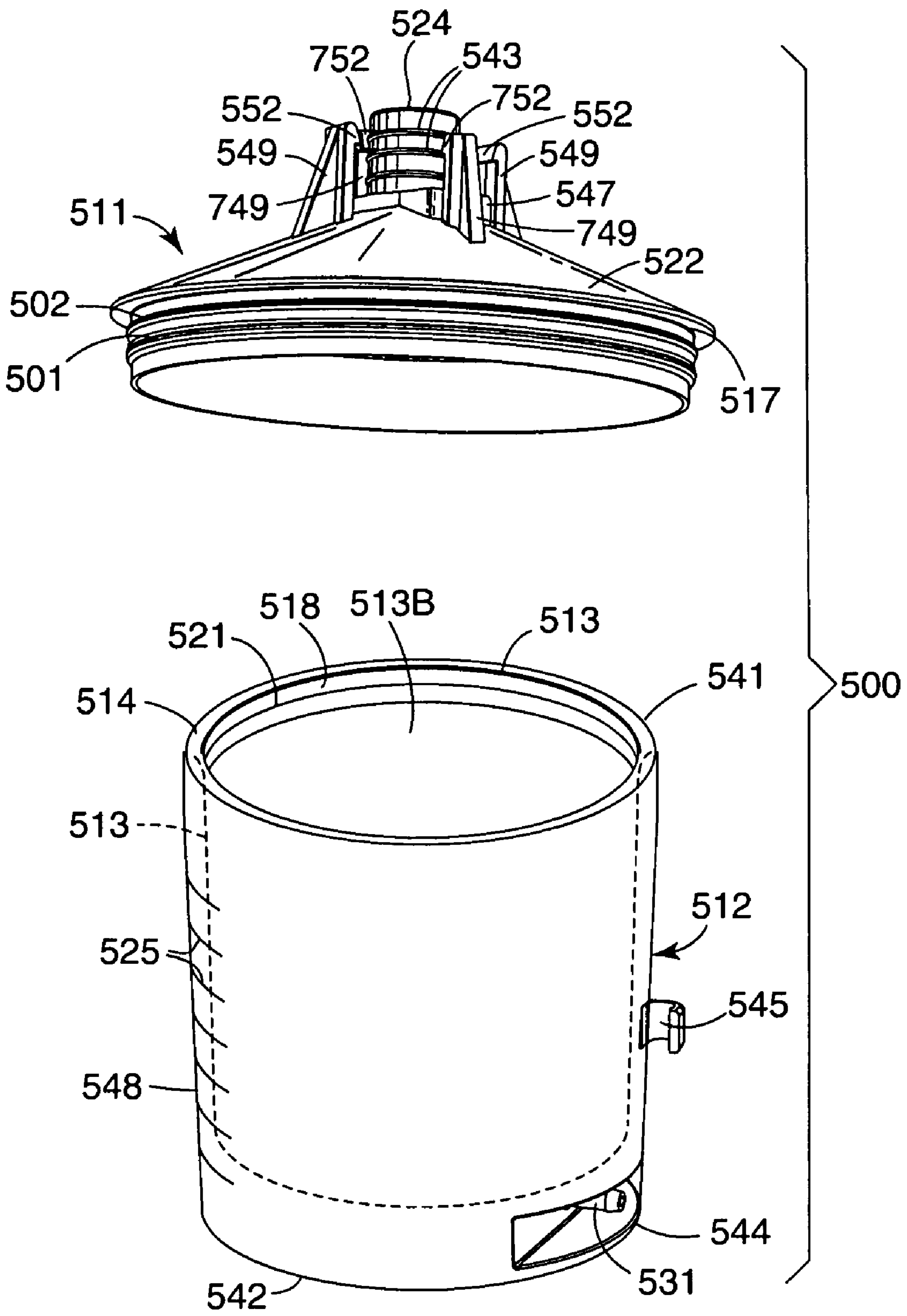
FIG. 5 is an exploded perspective view of another exemplary liquid supply assembly according to the present invention.

Although exemplary liner 13 is shown as a separate component in FIG. 1, in a further exemplary embodiment of the present invention, liner 13 is integrally connected to container 12 (see, for example, exemplary liquid supply system 500 in FIG. 5). In this embodiment, liner 13 may be attached to container 12 such that liner rim 14 forms a permanent bond with upper container surface 15 of container 12. In other embodiments, liner rim 14 and/or a portion of side walls 13B are integrally joined to upper container surface 15 and/or inner side wall surface 221 of container 12.

When liner 13 is attached to container 12 to form an integral component of container 12, liner 13 may be attached to container 12 using any suitable method including, but not limited to, ultrasonic welding, any thermal bonding technique (e.g., heat and/or pressure applied to melt a portion of the liner, the container, or both), adhesive bonding, etc. In one exemplary embodiment of the present invention, the liner is attached to the container using an ultrasonic welding process.

C. Lid Component

The liquid supply assemblies of the present invention further comprise a lid component, such as exemplary lid component 11 of exemplary liquid supply assembly 10. The lid component typically comprises a filter component (not shown) either permanently or temporarily attached to a lower surface of the lid component (i.e., facing liner 13 shown in FIG. 1). Lid 11 may be formed utilizing any suitable process, and, in an embodiment, comprises an injection molded part formed from a plastic material such as polypropylene. In an embodiment, lid 11 is transparent to enable viewing of an inner surface of the lid component and any component (e.g., filter component) attached to the inner surface.

Lid 11 may be formed to have any desired shape. Suitable shapes include, but are not limited to, a conical shape, a cylindrical shape, a tubular shape having a rectangular cross-sectional area, or a tubular shape having a square cross-sectional area. In one embodiment, as shown in FIG. 1, lid 11 has a conical shape with a first end and a second end opposite the first end, wherein the second end has a second end cross-sectional area that is smaller than a first end cross-sectional area.

As shown in FIG. 1, the lid component may further comprise one or more components capable of connecting to (i) a liquid spraying device or (ii) an adapter capable of connecting to the liquid spraying device, wherein the one or more components are positioned on an outer surface and at a second end of the lid component. For example, as shown in exemplary lid component 11, the lid component may comprise axially-spaced radially outwardly projecting sealing rings 43 along the outer surface of cylindrical portion 24 positioned on boss 47, and opposed inwardly projecting lips 52 on the distal ends of projecting hook members 49, which are equally spaced from and on either side of cylindrical portion 24 extending from outer surface 22 of exemplary lid component 11.

The above-described component features may be used to attach the lid component to a spraying device as described in U.S. Pat. No. 6,536,687 (Navis et al.), the subject matter of which is incorporated herein in its entirety by reference. (See, in particular, FIGS. 1-3 and the accompanying disclosure for a description of an exemplary system of attaching the lid component of the present invention to a spraying device.)

D. Shroud Component

The liquid supply assemblies of the present invention may further comprise a shroud component, such as exemplary shroud component 60 of exemplary liquid supply assembly 10. The shroud component of the present invention provides support to the lid component by extending over and restricting expansion of the lid component when exposed to high pressure. Like the above-described lid component, the shroud component may comprise an injection molded part formed from a plastic material such as polypropylene or polyamide. In one embodiment, shroud component 60 can be transparent to enable viewing of the lid component and the contents within the liquid supply assembly.

Shroud component 60 may be formed to have any desired shape including, but not limited to, the above-described shapes of the lid component. In one embodiment, as shown in FIG. 1, shroud component 60 has a conical shape with a first end 64 and a second end 63 opposite first end 64, wherein the second end 63 has a second end cross-sectional area that is smaller than a first end cross-sectional area.

In one exemplary embodiment of the present invention (shown in FIG. 1), shroud component 60 has a shape complementary to the shape of lid component 11. In other words, in this embodiment, shroud component 60 has a shape such that a lower surface of shroud component 60 extends along and covers a substantial portion of outer surface 22 of lid component 11. Further, in this embodiment, shroud component 60 has a shape such that a lower surface of shroud rim 61 extends along and covers a substantial portion of an upper surface of lid rim 17.

As shown in FIG. 1, shroud component 60 may further comprise one or more components positioned along an outer surface at second end 63 of shroud component 60. For example, as shown in exemplary shroud component 60, shroud component 60 may comprise opposed inwardly projecting lips 152 on the distal ends of projecting hook members 149 (see also, FIG. 5), which are equally spaced from and on either side of shroud opening 62. Exemplary shroud component 60 also comprises opposed inwardly projecting members 150 (see also, FIG. 5), which are equally spaced from and on either side of shroud opening 62. Projecting members 150 rest on outer surfaces of projecting hook members 49 of exemplary lid component 11 when exemplary shroud component 60 is positioned on and over exemplary lid component 11.

In some embodiments of the present invention, opposed inwardly projecting lips 152 and projecting hook members 149 of exemplary shroud component 60 may be used alone or in combination with one or more lid components (e.g., axially-spaced radially outwardly projecting sealing rings 43, cylindrical portion 24, boss 47, opposed inwardly projecting lips 52, and projecting hook members 49) to engage with (i) a liquid spraying device or (ii) an adapter capable of connecting to the liquid spraying device.

As shown in FIG. 1, shroud component 60 may further comprise one or more collar engaging members 65 positioned along shroud rim 61. Collar engaging members 65 may be used to securely engage upper rim 18 of collar 20 (described below) when collar 20 is used in the liquid supply assembly. Each of collar engaging members 65 may comprise outwardly projecting lips 66 on the distal ends of collar engaging members 65 to engage upper rim 18 of collar 20.

In a further exemplary embodiment of the present invention as shown in FIG. 5, shroud component 60 is not necessary due to an alternative design of exemplary lid component 511. In this embodiment, exemplary liquid supply assembly 500 comprises lid component 511 having a wall thickness suitable for higher pressure systems. For example, lid component 511 may have a wall thickness of at least 3.0 mm (0.12 in) in order to provide sufficient structural strength for higher pressure systems. Further, lid component 511 comprises a second set of threads 501 extending along a lower, outer surface 502 of lid component 511. Second set of threads 501 are capable of engaging with a first set of threads 521 on an inner surface of container 512.

Exemplary lid component 511 further comprises one or more components capable of connecting to (i) a liquid spraying device or (ii) an adapter capable of connecting to the liquid spraying device as described above with reference to exemplary lid component 11. In particular, exemplary lid component 511 comprises axially-spaced radially outwardly projecting sealing rings 543 along the outer surface of cylindrical portion 524 positioned on boss 547, a first pair of opposed inwardly projecting lips 552 on the distal ends of projecting hook members 549, and a second pair of opposed inwardly projecting lips 752 on the distal ends of projecting hook members 749, wherein both pairs of projecting hook members are equally spaced from and on either side of cylindrical portion 524 extending from outer surface 522 of exemplary lid component 511.

As shown in FIG. 5, exemplary liquid supply assembly 500 comprises lid component 511 and container 512. In this exemplary embodiment, container 512 comprises collapsible liner component 513. Side wall 513B of collapsible liner component 513 can be seen positioned within side wall 548 proximate top end 541. As discussed above, collapsible liner component 513 may be connected to container 512 via any method, such as an ultrasonic bonding method. Container 512 further comprises bottom wall 544 extending across and closing bottom end 542 of side wall 548, indicia 525, an air inlet (not shown) in side wall 548, air inlet fitting 531 suitable for connecting to an air hose (not shown) and hose retaining clip 545 extending from side wall 548.

In this exemplary embodiment, second set of threads 501 of lid component 511 engages with first set of threads 521 (shown through side wall 513B of collapsible liner component 513 in FIG. 5) on an inner surface of container 512. Side wall 513B of collapsible liner component 513 is pinched between second set of threads 501 and first set of threads 521 as lid component 511 is engaged with container 512. Desirably, lid component 511 is engaged with container 512 so that a lower surface of lid rim 517 comes into contact with liner rim 514 of collapsible liner component 513.

As discussed above, it should be noted that lid component 511 could have an alternative design wherein second set of threads 501 are positioned on an inner surface of lid component 511 so as to engage with a container similar to container 12 shown in FIGS. 1-2. Further, it should be noted that other mechanical features may be used in place of the exemplary threads to engage lid component 511 to container 512 (or container 12 shown in FIGS. 1-2).

E. Collar

The liquid supply assemblies of the present invention may further comprise a collar, such as collar 20 of exemplary liquid supply assembly 10. When present, the collar has a top end having a collar opening therein, a bottom end, and at least one collar side wall extending between the top end and the bottom end, a collar rim extending along the top end and protruding into the collar opening, and a second set of threads extending along the at least one collar side wall, wherein the second set of threads is capable of engaging with a first set of threads on the container (described above).

As shown in FIG. 1 and as discussed above, exemplary collar 20 comprises upper rim 18 and collar threads 19 positioned on an inner surface of collar 20. Upper rim 18 and collar threads 19 engage with container threads 21 to secure shroud component 60, lid component 11 and liner 13 in exemplary liquid supply assembly 10. As discussed above, upper rim 18 engages with collar engaging members 65 of shroud 60, when present, to securely connect collar 20 to shroud 60. As collar 20 is forced onto shroud 60, collar engaging members 65 are deflected inward until upper rim 18 passes outwardly projecting lips 66 on collar engaging members 65. Once upper rim 18 passes outwardly projecting lips 66, collar 20 is securely connected to shroud 60 such that a portion of outwardly projecting lips 66 on collar engaging members 65 extend over a portion of upper rim 18 of collar 20.

Collar 20 may be constructed of any suitable material, and, in exemplary embodiments, may be formed from a molded plastic component, or may be a machined metal (for example, aluminum) component. In one embodiment of the present invention, collar 20 is a molded plastic component comprising glass fiber reinforced nylon.

Figure 6:
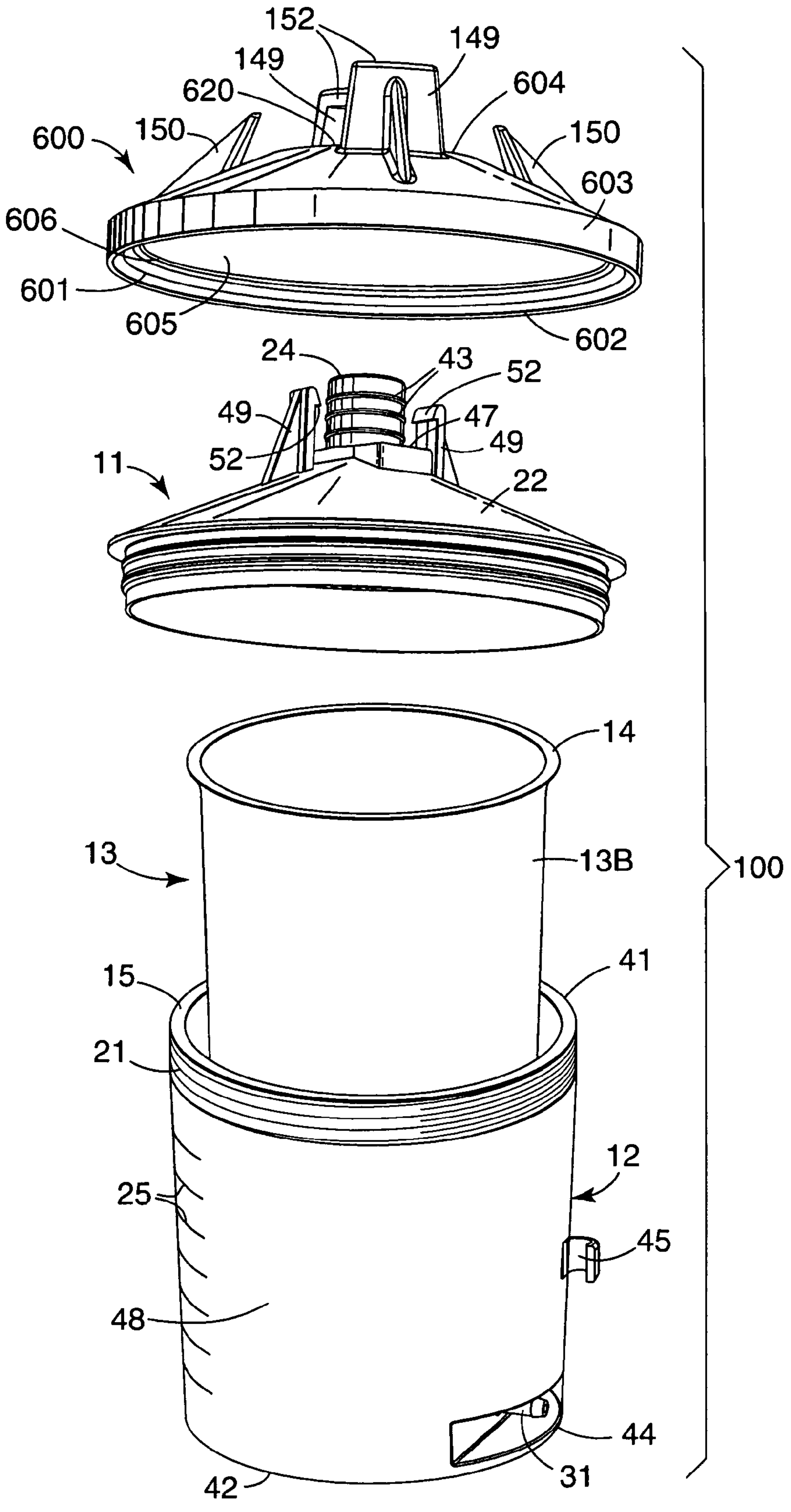
FIG. 6 is an exploded perspective view of another exemplary liquid supply assembly according to the present invention.

In further exemplary embodiments of the present invention as shown in FIGS. 5-6, collar 20 is not necessary due to an alternative design of either lid component 11 or shroud component 600. In one exemplary embodiment, the shroud component comprises a second set of threads extending along an inner surface of the shroud component proximate a first end of the shroud component. The second set of threads is capable of engaging with a first set of threads on the container (described above).

As shown in FIG. 6, exemplary liquid supply and filter assembly 100 comprises shroud component 600, lid 11, liner 13 and container 12. Shroud component 600 comprises inner threads 601 positioned along an inner surface 602 of first end 603 opposite second end 604 having opening 620 therein.

Inner threads 601 engage with container threads 21 positioned on side wall 48 at top end 41 of container 12 to secure lid 11 and liner 13 in place between shroud component 600 and container 12.

As discussed above, it is desirable for a lower surface 605 of shroud component 600 to extend along and cover a substantial portion of outer surface 22 of lid component 11. Further, in this embodiment, it is desirable for shroud component 600 to have a ledge 606 extending along lower surface 605 and having a ledge surface extending substantially horizontal such that the ledge surface of ledge 606 comes into contact with and covers a substantial portion of an upper surface of lid rim 17 when shroud component 600 is positioned over lid component 11.

Although shroud component 600 comprises threads 601 positioned along an inner surface 602 of shroud component 600, as noted above, shroud component 600 could have an alternative design wherein threads 601 are positioned on an outer surface of shroud component 600 so as to engage with a container similar to container 512 shown in FIG. 5. Further, as noted above, alternative mechanical features may be used in place of exemplary threads 601 to engage container 12 (or container 512 shown in FIG. 5).

F. Optional Pressure Relief Valves

As discussed above, a deliberately weakened area (e.g., pressure relief area 36) may be located in exemplary container 12 as shown in FIG. 4 to prevent excess pressure build-up within container 12. Alternatively, one or more pressure relief valves may be used in exemplary container 12 or any other assembly component in which pressure can potentially reach an undesirable level (e.g., lid component 511 shown in FIG. 5 or air hose 71 shown in FIG. 7 below).

Figure 10A:
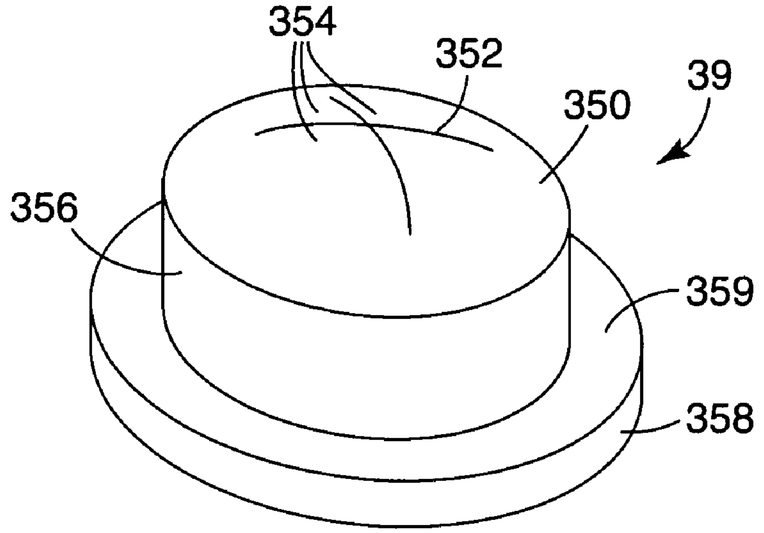
FIG. 10*a* is an exploded perspective view of an exemplary pressure relief valve suitable for use in liquid supply assemblies of the present invention.
Figure 10B:
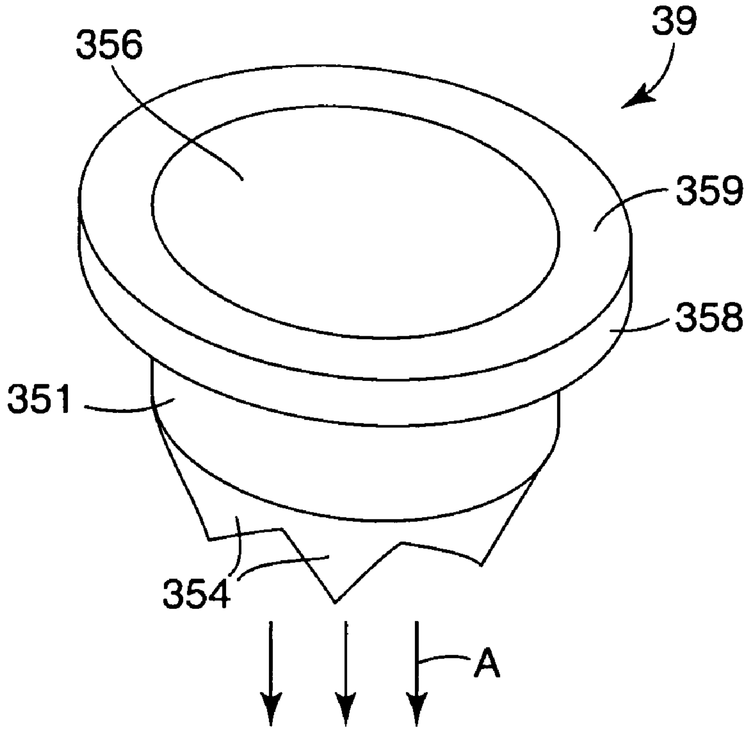
FIG. 10*b* is an exploded perspective view of the exemplary pressure relief valve of FIG. 10*a* in a stressed/opened state.

In one exemplary embodiment, a pressure relief valve referred to herein as "an invertible pressure relief valve", such as exemplary flow control valve 39 shown in FIGS. 10*a*-10*b*, is used in the liquid supply assembly of the present invention. As shown in FIG. 10*a*, exemplary flow control valve 39 comprises an upper valve surface 350 having one or more slits 352 through upper valve surface 350 such that slits 352 divide upper valve surface 350 into two or more tabs 354. In exemplary flow control valve 39, there are two (2) slits 352 and four (4) tabs 354. Exemplary flow control valve 39 further comprises sidewall 356 and base 358 having an upper base surface 359. In the relaxed or closed condition shown in FIG. 10*a*, slits 352 are closed such that peripheral edges of tabs 354 (e.g., forming slits 352) are in contact with one another so as to prevent fluid (e.g., air) from passing through slits 352. It should be noted that although exemplary flow control valve 39 is shown with four (4) tabs 352, any number of slits 352/tabs 354 may be present as desired.

When a threshold amount of pressure is exerted onto upper valve surface 350 of exemplary flow control valve 39, exemplary flow control valve 39 inverts to an "open" position as shown in FIG. 10*b*. In the inverted, "open" position, a portion of sidewall 356 moves to a position below base 358 exposing inner surface 351. In this position, tabs 354 separate from one another so that fluid (e.g., air) is able to pass through exemplary flow control valve 39 in the direction as shown by arrows A, resulting in an immediate drop in system pressure.

Exemplary flow control valve 39 may be placed in one or more locations within the liquid supply assemblies of the present invention. For example, a pressure relief valve, such as exemplary flow control valve 39, may be located within a wall of container 12 shown in FIGS. 1-4, such as side wall 48, bottom wall 44, or both. In one exemplary embodiment, a pressure relief valve, such as exemplary flow control valve 39, is located within bottom wall 44 of container 12 at pressure relief area 36. In this embodiment, upper valve surface 350 of exemplary flow control valve 39 is positioned above upper surface 35 of bottom wall 44. When the pressure within container 12 exceeds a threshold limit, exemplary flow control valve 39 inverts such that a portion of exemplary flow control valve 39 extends through bottom wall 44 of container 12. The resulting pressure release causes fluid (e.g., air) leaving container 12 to be directed downward away from collapsible liner 13 within container 12, and away from an operator using the liquid supply assembly.

Figure 11:
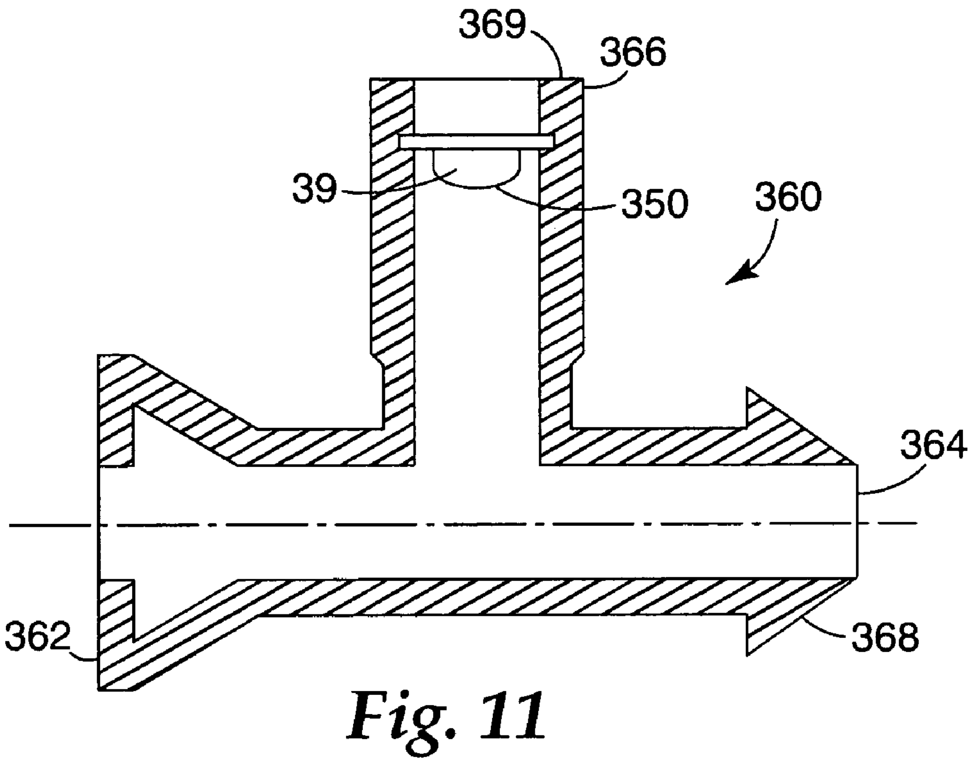
FIG. 11 is a cross-sectional view of an exemplary T-section pressure relief valve suitable for use in liquid supply assemblies of the present invention.

In another exemplary embodiment, a pressure relief valve, such as exemplary flow control valve 39, may be located within an air hose (e.g., air hose 71 shown in FIG. 7 below) as shown in FIG. 11. In this exemplary embodiment, a pressure relief valve, such as exemplary flow control valve 39, may be used as a component of a T-shaped pressure relief valve such as exemplary pressure relief valve 360 shown in FIG. 11. Exemplary pressure relief valve 360 comprises a first connection end 362, a second connection end 364 and a pressure relief end 366. First connection end 362 is designed to mate with fitting end 33 of air inlet fitting 31 (see FIG. 2) or connect to one end of an air hose. Second connection end 364 having connector 368 is designed to connect to an end of an air hose. Exemplary flow control valve 39 is positioned along pressure relief end 366. Typically, exemplary flow control valve 39 is either within pressure relief end 366 (as shown in FIG. 11) or attached to the opening 369 of pressure relief end 366. Desirably, exemplary pressure relief valve 360 is positioned such that pressure relief end 366 is directed downward and/or away from an operator of a liquid supply assembly.

A variety of commercially available pressure relief valves, such as exemplary flow control valve 39, may be used in the present invention. Commercially available pressure relief valves suitable for use in the present invention include, but are not limited to, flow control valves commercially available from Liquid Molding Systems, Inc., (Midland, Mich.) under the trade designations SureFlo™ and MediFlo™. These pressure relief valves typically comprise a single continuous molded structure comprising a polymeric or elastomeric material such as a silicone rubber. In one exemplary embodiment, a SureFlo™ silicone valve commercially available from Liquid Molding Systems, Inc. is used as a pressure relief valve in a container (e.g., container 12) of a liquid supply assembly of the present invention.

Pressure relief valves, such as exemplary flow control valve 39, may be incorporated into exemplary container 12 or any other assembly component (e.g., exemplary pressure relief valve 360) by a variety of methods. For example, a pressure relief valve may be incorporated into exemplary container 12 or any other assembly component via an ultrasonic bonding step, an adhesion bonding step, or by use of any other mechanical device (e.g., a retaining ring positioned along and secured to a surface of a wall of container 12). In one exemplary embodiment, a pressure relief valve, such as a SureFlo™ silicone valve, is ultrasonically bonded to bottom wall 44 of container 12 at pressure relief area 36 (see, for example, FIGS. 3-4).

Figure 12:
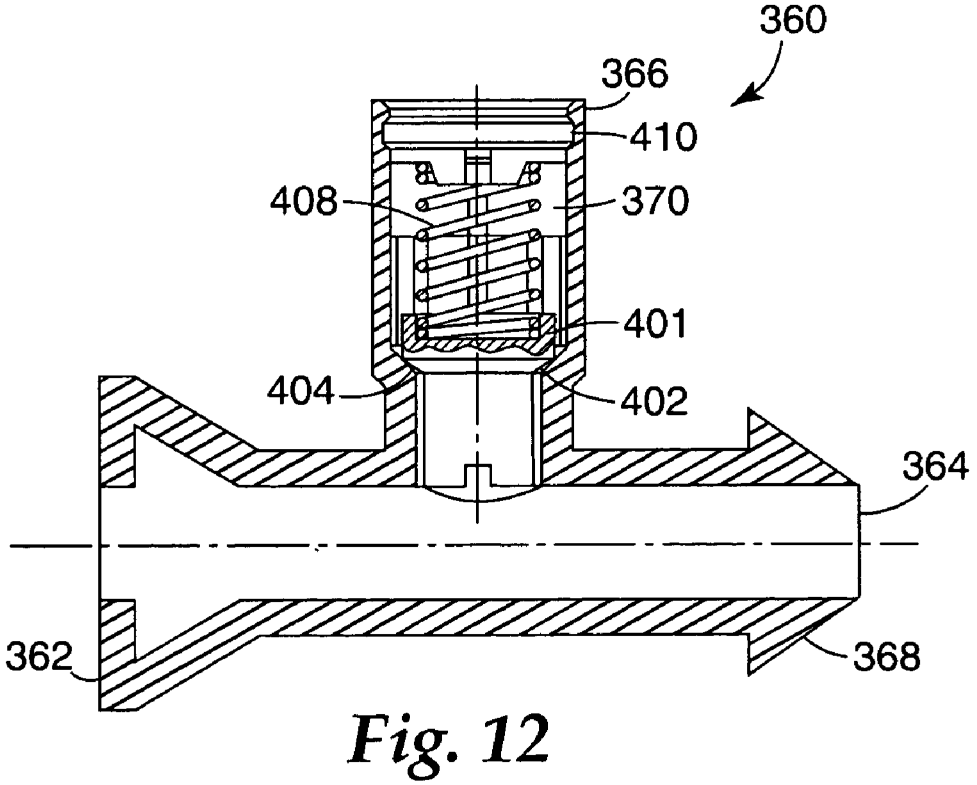
FIG. 12 is a cross-sectional view of another exemplary T-section pressure relief valve suitable for use in liquid supply assemblies of the present invention.

In a further exemplary embodiment, a spring-biased pressure relief valve may be used to provide protection against excessive pressure build-up in the liquid supply assemblies of the present invention. As shown in FIG. 12, exemplary T-shaped pressure relief valve 360 comprises a spring biased pressure control mechanism 370 positioned within pressure relief end 366. Spring-biased pressure control mechanism 370 comprises member 401 having sealing surface 402, which abuts a corresponding inner surface 404 of pressure relief end 366. One or more springs 408 positioned against brace 410 and above member 401 apply a spring force on member 401 so as to press sealing surface 402 against corresponding inner surface 404. When sealing surface 402 is pressed against corresponding inner surface 404, fluids (e.g., air) cannot escape through pressure relief end 366 unless the fluid pressure within exemplary T-shaped pressure relief valve 360 exceeds a threshold amount (e.g., a force greater than the spring force). When the system pressure exceeds a threshold amount, spring 408 compresses, which results in a disconnect between sealing surface 402 of member 401 and corresponding inner surface 404 of exemplary T-shaped pressure relief valve 360 enabling fluid (e.g., air) to escape exemplary T-shaped pressure relief valve 360, thus relieving the system pressure.

Spring-biased pressure relief valves, such as exemplary T-shaped pressure relief valve 360, are commercially available from a number of sources. Commercially available T-shaped spring-biased pressure relief valves suitable for use in the present invention include, but are not limited to, "T" relief valves commercially available from Halkey-Roberts (St. Petersburg, Fla.) under the trade designation "T" PRESSURE RELIEF PORT (e.g., Model No. C24781).

The above-described pressure relief valves may be used to prevent build-up of system pressure within the liquid supply assemblies of the present invention above a threshold amount. Typically, the pressure relief valves release pressure within a given liquid supply assembly when the threshold pressure amount is equal to or greater than about 206.8 kPa (30 psi) (or about 241.3 kPa (35 psi), or about 275.7 kPa (40 psi)).

In an exemplary embodiment of the present invention, one of more of the above-described pressure relief valves is positioned within the liquid supply assembly so as to be removable and/or replaceable. In this embodiment, a given pressure relief valve may be replaced with a similar or different pressure relief valve in order to, for example, adjust the threshold pressure capacity of the liquid supply assembly, or to replace a used or defective valve. For example, in one embodiment, an invertible-type of pressure relief valve may be positioned along and attached to a side wall of a container using a retaining ring. The invertible pressure relief valve may be removed and replaced with another similar or different pressure relief valve as desired by disconnecting or disengaging the retaining ring, replacing the valve, and reconnecting or engaging the retaining ring. In another embodiment, a spring-biased type pressure relief valve (e.g., exemplary valve 360 shown in FIG. 12) positioned along an air hose of a given liquid supply assembly may be replaced with another similar or different spring-biased type pressure relief valve or a different pressure relief valve (e.g., exemplary valve 360 shown in FIG. 11) by disconnecting the spring-biased type pressure relief valve from the air hose, and substituting another pressure relief valve in its place.

G. Additional Optional Components

The liquid supply assemblies of the present invention may further comprise one or more additional, optional components. Suitable optional components include, but are not limited to, a filter element that can be permanently or temporarily attached to the lid component, a gasket that can be positioned between the lid component and the liner (or liner component of the container), an indicating sheet having indicia thereon to assist a user when introducing one or more liquids into the collapsible liner, and an adapter for connecting the lid component to a spraying device positioned between the lid component and the spraying device.

In one embodiment of the present invention, a gasket is positioned between the lid component and the liner (or liner component of the container) in order to provide a better seal between the lid component and the liner (or liner component of the container). For example, a gasket may be positioned along lower portion 16 of lid component 11 along a lower surface of lid rim 17. The gasket provides a better seal between a lower surface of lid rim 17 and liner rim 14 of liner 13. In this embodiment, the liquid supply assembly may withstand a container pressure of at least about 137.9 kPa (20 psi), and in some cases greater than 137.9 kPa (20 psi).

Suitable gaskets for use in the present invention include, but are not limited to, O-rings and rubber bands. In one embodiment of the present invention, an O-ring is positioned between the lid component and the liner of the liquid supply assembly in order to provide a better seal between the lid component and the liner.

II. Methods of Making Liquid Supply Assemblies

The present invention is also directed to methods of making liquid supply assemblies. In one exemplary embodiment, the method of making a liquid supply assembly comprises the step of (a) forming a container, wherein the container comprises (i) at least one container side wall, (ii) a container bottom end, (iii) a container top end having a container opening therein, (iv) a first set of threads extending along the at least one container side wall proximate the top end, (v) an air inlet within the at least one container side wall proximate the bottom end, and (vi) a plurality of air distribution fins extending along an upper surface of the container bottom end. The exemplary method of making a liquid supply assembly may further comprise one or more of the following steps: (b) providing one or more pressure relief areas or pressure relief valves within the container bottom end during or after the container forming step; (c) providing a lid component; (d) forming an optional shroud component having a shape complementary to the lid component; (e) providing a collapsible liner capable of fitting within the container; (f) integrally attaching a collapsible liner component to the container; and (g) assembling the container, the liner (when present), the lid component, the optional shroud component, and an optional collar component with one another to form a pressurizable system.

In another exemplary embodiment, the method of making a liquid supply assembly comprises the step of: (a) providing a lid component having one or more lid components capable of connecting to (i) a liquid spraying device or (ii) an adapter capable of connecting to the liquid spraying device, the one or more lid components being positioned on an upper surface of the lid component; (b) optionally providing a shroud component having a shape complementary to the lid component such that the one or more lid components extend through an opening in the shroud component; (c) providing a container; (d) providing a collapsible liner or collapsible liner component capable of fitting within the container and engaging with the lid component; and (e) assembling the container, the liner or collapsible liner component, the lid component, the optional shroud component, and an optional collar component with one another to form a pressurizable system capable of withstanding a container pressure of at least about 69.0 kPa (10 psi).

In either of the exemplary methods described above, the method may further comprise one or more steps of: (a) forming a container having an integrally attached collapsible liner component; (b) forming a lid component having a wall thickness such that the lid component in combination with the container can withstand a container pressure of at least about 69.0 kPa (10 psi) (at least about 103.4 kPa (15 psi), at least about 137.9 kPa (20 psi), at least about 172.4 kPa (25 psi), at least about 206.8 kPa (30 psi)); (c) forming a container having an internal or external set of threads (or other mechanical feature) thereon for connecting to corresponding threads (or other mechanical feature) on a lid component, a shroud component or a collar component; (d) forming a lid component having an internal or external set of threads (or other mechanical feature) thereon for connecting to corresponding threads on a container; (e) forming a shroud component having an internal or external set of threads (or other mechanical feature) thereon for connecting to corresponding threads on a container; (f) filling the collapsible liner or collapsible liner component with one or more liquids; (g) connecting an air hose to the container; (h) connecting the liquid supply assembly and/or air hose to a spraying device; (i) supplying air to the liquid supply assembly; (j) regulating the container pressure of the pressurized liquid supply assembly; (k) incorporating one or more pressure relief valves into one or more components of the liquid supply assembly; and (l) spraying a liquid from the spraying device.

III. Methods of Using Liquid Supply Assemblies

Also disclosed are methods of using the above-described liquid supply assemblies to apply a liquid onto a substrate. The above-described liquid supply assemblies, while suitable for use with any type of spraying device, are particularly useful on pressure-fed spraying devices, such as exemplary spraying device 70 shown in FIGS. 7-8, as well as similar commercially available pressure-fed spraying devices.

Spraying devices are commercially available from a number of sources including, but not limited to, BINKS® and DEVILBISS™ products commercially available from ITW Industrial Finishing, Inc. (Glendale Heights, Ill.); spraying devices commercially available from Graco Inc. (Minneapolis, Minn.); spraying devices commercially available from Sharpe Manufacturing Company (Minneapolis, Minn.); and spraying devices commercially available from Accuspray (Cleveland, Ohio). Exemplary commercially available spraying device include BINKS® Mach 1 HVLP Pressure Feed Systems, DEVILBISS™ JGA Pressure Feed OutFits, Graco HVLP Spray Gun and Pressure Cup Assemblies, Sharpe 998 HVLP Pressure Feed Systems and Accuspray HVLP Spray Turbines. In one embodiment of the present invention, the liquid supply components and/or assemblies of the present invention are combined with a BINKS® Mach 1 HVLP Pressure Feed System.

Figure 7:
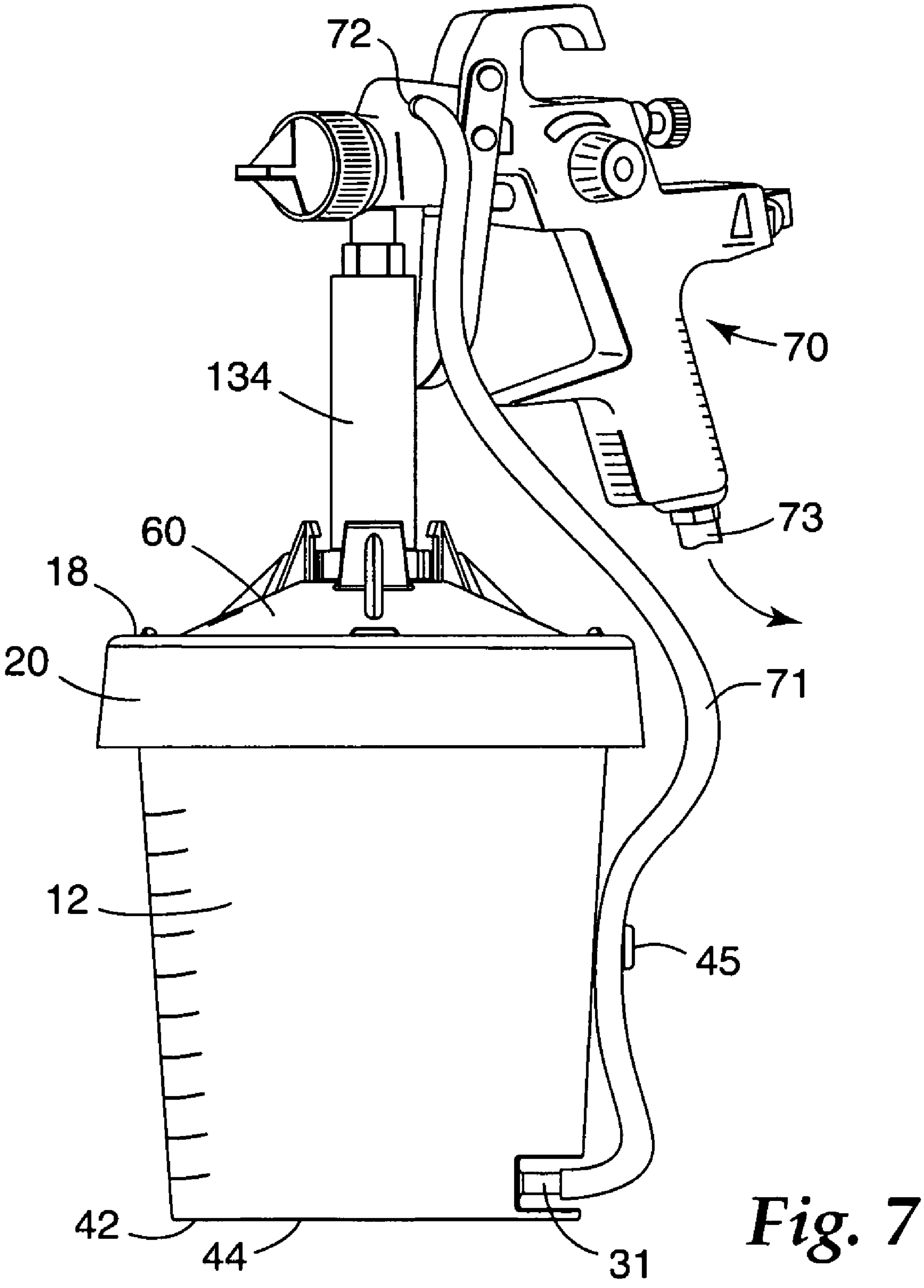
FIG. 7 is a perspective view of an exemplary liquid supply assembly of the present invention attached to a spraying device or spray gun.

As shown in FIG. 7, exemplary liquid supply assembly 10 may be attached to exemplary spraying device 70 via adapter 134. Adapter 134 fits over cylindrical portion 24 of lid 11 and engages with opposed inwardly projecting lips 52 on the distal ends of projecting hook members 49 of lid 11. A more detailed view of adapter 134 and the connection between exemplary liquid supply and filter assembly 10 and exemplary spraying device 70 is provided in FIG. 9 described below.

FIG. 7 depicts one embodiment of the present invention, wherein exemplary liquid supply assembly 10 is attached to exemplary spraying device 70 via adapter 134. Air is supplied to container 12 via air hose 71 attached to air inlet 31. In this embodiment, air is supplied to container 12 via air hose 71, which is attached to an air supply fitting 72 located on spraying device 70. An air source (not shown) is attached to air hose 73 to provide air to spraying device 70, and subsequently to container 12 once trigger of spraying device 70 is engaged.

Figure 8:
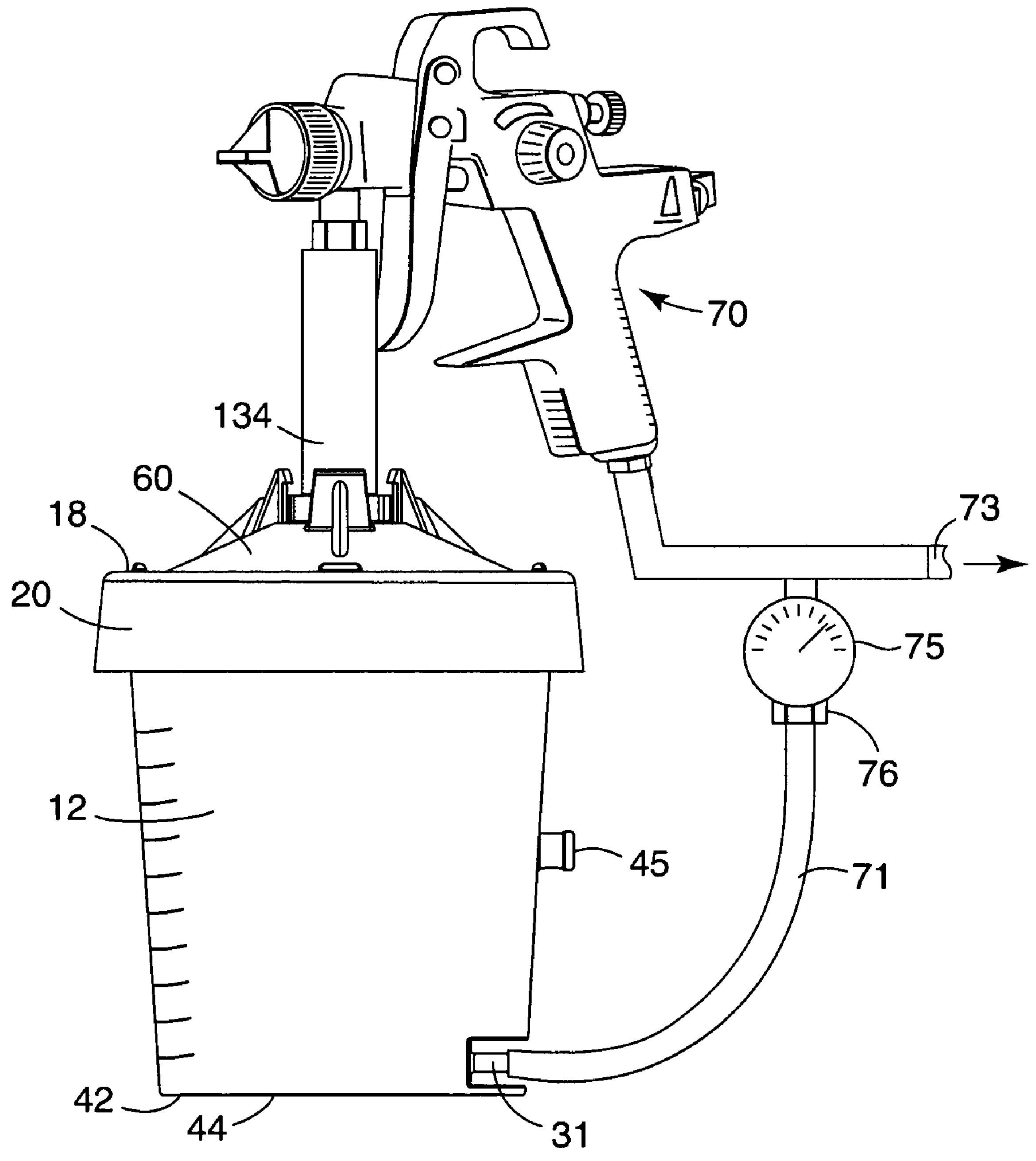
FIG. 8 is a perspective view of another exemplary liquid supply assembly of the present invention attached to a spraying device or spray gun.

FIG. 8 depicts another embodiment of the present invention, wherein exemplary liquid supply assembly 10 is attached to exemplary spraying device 70 via adapter 134. In this embodiment, air is also supplied to container 12 via air hose 71 attached to air inlet 31; however, air is supplied to container 12 via air hose 71 containing regulator 75 therein, which is attached to an air supply fitting 76 located between an air supply (not shown) and spraying device 70. An air source (not shown) is attached to air hose 73 to provide air to (i) spraying device 70 and (ii) through regulator 75 to container 12 thereby allowing control of air pressure (i.e., container pressure) within container 12.

Figure 9:
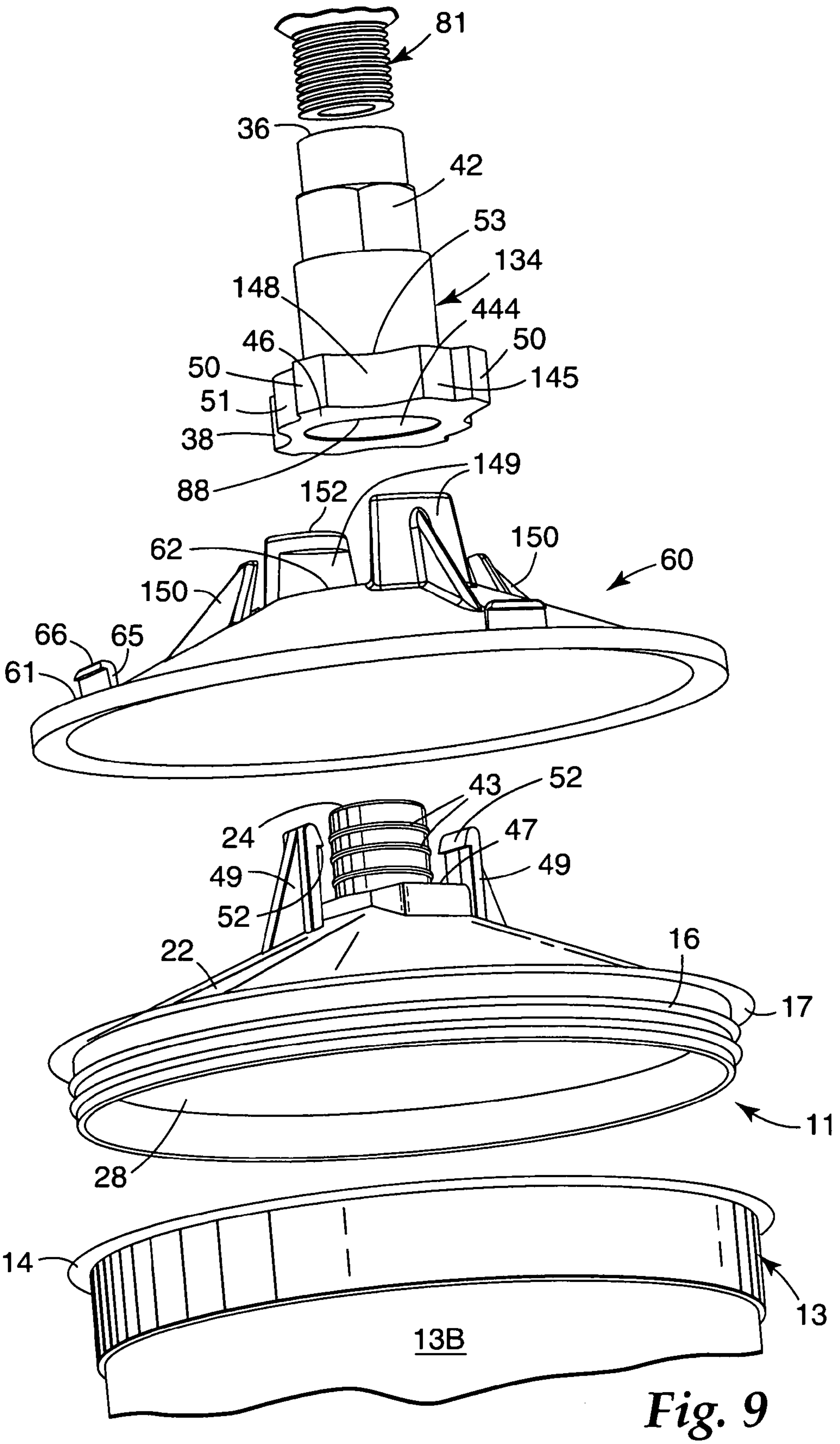
FIG. 9 is an exploded perspective view of an exemplary adapter for connecting a liquid supply assembly according to the present invention to a spraying device or spray gun.

As shown in FIG. 9, exemplary adapter 134 comprises first and second spaced end portions 36 and 38, and has a through opening 88 extending through end portions 36 and 38. First end portion 36 of adapter 134 has internal threads (not shown) and six flattened wrench engagable surface portions 42 around a periphery of adapter 134 near first end portion 36 such that adapter 134 is releasably engagable with external threads on an inlet port 81 of spraying device 70. Lid 11 and second end portion 38 of adapter 134 have connector parts that are adapted for forming a releasable liquid tight engagement so that through opening 91 (through lid 11) and opening 88 (through adapter 134) are in communication with one another.

When engaged, cylindrical portion 24 of lid 11 with sealing rings 43 is in liquid tight engagement with inner surface 444 of adapter 134. Further, end surface 46 on adapter collar 145 surrounding second end portion 38 of adapter 134 abuts boss 47 of lid 11 around cylindrical portion 24. Adapter collar 145 has major cylindrically concave recesses 148 along opposite sides adapted to pass distal ends of hook members 49 projecting from outer surface 22 of lid 11 on opposite sides of cylindrical portion 24 when cylindrical portion 24 is pressed axially into opening 88 of adapter 134. At this point, lid 11 and adapter 134 are in a first relative position in which hook members 49 are aligned with major recesses 148 in adapter collar 145. Lid 11 and adapter 134 can then be rotated relative to each other to a second relative position to cause the resiliently flexible projecting hook members 49 to move around and locate into minor concave recesses 51. In this second relative position, projecting hook members 49 are positioned in minor cylindrically concave recesses 51 in adapter collar 145 while opposed inwardly projecting lips 52 on distal ends of projecting hook members 49 are engaged over a surface 53 of adapter collar 145 adjacent second end 38 of adapter 134.

Adapter 134 may be formed from any suitable material, for example, a polymeric or metallic material. In one exemplary embodiment, adapter 134 is formed from a metallic material (e.g., stainless steel).

As shown in FIG. 9, exemplary shroud component 60 is positioned between lid component 11 and adapter 134. Shroud opening 62 is sized so that adapter 134 may be positioned within shroud opening 62 and engage with lid 11 as discussed above. Further, shroud component 60 may be designed so that one or more components on an upper surface of shroud component 60 (e.g., opposed inwardly projecting lips 152 and projecting hook members 149) also engage with adapter 134.

Prior to beginning the above-described connection steps or after partial completion of the above-described connection steps, a user may first mix one or more liquids in liner 13 outside of or positioned within container 12, using indicia 25 to indicate the levels to which each liquid should be sequentially poured into liner 13 to achieve a desired ratio between the one or more liquids. Any indicia 25 may be used on container 12 to assist a user when measuring one or more liquids. In one embodiment of the present invention, an indicating sheet having indicia thereon is used to assist a user when measuring one or more liquids. Such an indicating sheet is disclosed in U.S. Pat. No. 6,588,681 (Rothrum et al.) (i.e., indicating sheet 24 having indicia 25 thereon as shown in FIG. 1 of U.S. Pat. No. 6,588,681), the subject matter of which is incorporated herein in its entirety by reference. In this embodiment, the indicating sheet may be positioned within container 12 so that a lower edge of the indicating sheet rests on an upper surface of air distribution fins 34 and rest members 340 (see FIG. 3).

Typically, one or more liquids are poured into liner 13 described above. Liner 13 may be filled prior to or after being positioned within container 12. After filling liner 13 to a desired level, lid component 11 is engaged with liner 13. Optionally, a gasket may be used between lid component 11 and liner 13 as discussed above. Once lid component 11 is engaged with liner 13, shroud 60 is positioned over lid component 11. Shroud 60 or collar 20 is screwed onto container 12 as described above to secure shroud 60, lid component 11 and liner 13 to container 12. Once the liquid supply assembly is assembled, the liquid supply assembly may be connected to a spraying device as described above.

After connecting the liquid supply assembly of the present invention to a spraying device, the spraying device is ready for use. Air pressure applies force against liner 13, feeding the one or more liquids in liner 13 into spraying device 70. It is believed that air distribution fins 34 along an upper surface 35 of bottom wall 44 within container 12 provide improved air flow and distribution along upper surface 35 of bottom wall 44. The resulting air flow and distribution along bottom wall 44 of container 12 causes a more uniformly applied force on the lower surface of collapsible liner 13 positioned within container 12.

As discussed above, the liquid supply assemblies of the present invention may be used in combination with a spraying device in a pressurized system, wherein the container pressure of the system is at least about 69.0 kPa (10 psi). Typically, the container pressure of the system ranges from about 34.5 kPa (5 psi) to about 206.8 kPa (30 psi), more typically from about 69.0 kPa (10 psi) to about 137.9 kPa (20 psi). However, in some embodiments, the container pressure of the system may be above about 137.9 kPa (20 psi).

When a given spray job is completed, spraying device 70 with exemplary liquid supply assembly 10 may be placed on a level surface to remain upright in a vertical position so that any remaining liquid in liner 13 is not in contact with lid component 11. In this position, the connector components can be disconnected.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A liquid supply assembly comprising:

a container having (i) at least one container side wall, (ii) a container bottom wall, (iii) a first set of mechanical features capable of engaging with a second set of mechanical features on a lid, an optional shroud component or an optional collar, and (iv) an air inlet within the at least one container side wall or the container bottom wall;

a collapsible liner capable of fitting within the container;

a lid having one or more lid components capable of connecting to (i) a liquid spraying device or (ii) an adapter capable of connecting to the liquid spraying device, the one or more lid components being positioned on an upper surface of the lid;

a shroud extending over the entire upper surface of the lid, configured to restrict expansion of the lid and having a shroud opening, the shroud opening being sized to enable the one or more lid components to extend through the shroud opening; and at least one pressure relief valve within the liquid supply assembly, said at least one pressure relief valve being capable of (i) preventing fluid from exiting the liquid supply assembly when a system pressure within said container is less than a threshold amount, and (ii) allowing fluid to exit the liquid supply assembly when the system pressure within said container is greater than or equal to the threshold amount, wherein the container, the collapsible liner, and the lid form a pressurizable assembly capable of withstanding a container pressure of at least about 69.0 kiloPascals (kPa) (10 pounds per square inch (psi)).

2. The assembly of claim 1, wherein the at least one pressure relief valve is positioned within the at least one container side wall, the container bottom wall, or both.

3. The assembly of claim 1, wherein the at least one pressure relief valve is positioned within the container bottom wall.

4. The assembly of claim 1, wherein the threshold amount is equal to or greater than about 206.8 kPa (30 psi).

5. The assembly of claim 1, wherein the at least one pressure relief valve comprises an invertible pressure relief valve.

6. The assembly of claim 1, wherein the at least one pressure relief valve is connected to an air hose supplying air to the liquid supply assembly.

7. The assembly of claim 6, wherein the at least one pressure relief valve comprises a spring-biased pressure relief valve.

8. A spraying device comprising the liquid supply assembly of claim 1.

9. The assembly of claim 1, wherein the shroud comprises:

a first shroud end, a second shroud end opposite the first shroud end, said second shroud end having the shroud opening therein, an inner shroud surface and an outer shroud surface both of which extend from the first shroud end to the second shroud end, and a shroud ledge extending along an outer periphery of the inner shroud surface.

10. The assembly of claim 9, wherein the shroud further comprises a second set of mechanical features extending along the inner or outer shroud surface proximate the first end of the shroud, the second set of mechanical features being capable of engaging with the first set of mechanical features on the container.

11. The assembly of claim 9, further comprising a collar, said collar comprising:

a top end having a collar opening therein, a bottom end, at least one collar side wall extending between the top end and the bottom end, a collar rim extending along the top end and protruding into the collar opening, and a second set of mechanical features extending along the at least one collar side wall, the second set of mechanical features being capable of engaging with the first set of mechanical features on the container.

12. A container suitable for use in a liquid supply assembly, the container comprising:

at least one container side wall;

a container bottom wall;

a first set of mechanical features capable of engaging with a second set of mechanical features on a lid;

the lid having one or more lid components capable of connecting to (i) a liquid spraying device or (ii) an adapter capable of connecting to the liquid spraying device, the one or more lid components being positioned on an upper surface of the lid;

a shroud extending over the entire upper surface of the lid, configured to restrict expansion of the lid and having a shroud opening, the shroud opening being sized to enable the one or more lid components to extend through the shroud opening;

an air inlet within said at least one container side wall or said container bottom wall; and at least one pressure relief valve within said at least one container side wall or said container bottom wall, said at least one pressure relief valve being capable of (i) preventing fluid from exiting said container when a system pressure within said container is less than a threshold amount, and (ii) allowing fluid to exit said container when the system pressure within said container is greater than or equal to the threshold amount.

13. The container of claim 12, wherein the threshold amount is equal to or greater than about 206.8 kPa (30 psi).

14. A liquid supply assembly comprising:

the container of claim 12;

a collapsible liner sized so as to fit within the container;

a lid having one or more lid components capable of connecting to (i) a liquid spraying device or (ii) an adapter capable of connecting to the liquid spraying device, the one or more lid components being positioned on an upper surface of the lid;

an optional shroud component having a shroud opening therein, said shroud opening being sized to enable the one or more lid components to extend through the shroud opening; and an optional collar capable of engaging with the container, wherein the container, the collapsible liner, the lid, the optional shroud, and the optional collar form a pressurizable assembly capable of withstanding a container pressure of at least about 69.0 kiloPascals (kPa) (10 pounds per square inch (psi)).

15. A liquid supply assembly comprising:

a container having (i) at least one container side wall, (ii) a container bottom wall, (iii) a first set of mechanical features capable of engaging with a second set of mechanical features on a lid, an optional shroud component or an optional collar, and (iv) an air inlet within the at least one container side wall or the container bottom wall;

a collapsible liner capable of fitting within the container;

a lid having a first end and a second end opposite the first end, an upper surface and a lower surface both of which extend from the first end to the second end, an opening extending through a portion of the lid from the first end to the second end, a lid rim extending along a periphery of the lid, and one or more lid components capable of connecting to (i) a liquid spraying device or (ii) an adapter capable of connecting to the liquid spraying device, the one or more lid components being positioned on the upper surface of the lid;

an shroud having a first shroud end, a second shroud end opposite the first shroud end, an upper shroud surface and a lower shroud surface both of which extend from the first shroud end to the second shroud end, a shroud opening in the second shroud end, said shroud opening being sized to enable the one or more lid components to extend through the shroud opening, and a shroud ledge extending along an outer periphery of the shroud wherein the shroud extends over the entire upper surface of the lid, and is configured to restrict expansion of the lid;

an collar capable of engaging with the container, said collar comprising a top end having a collar opening therein, a bottom end, at least one collar side wall extending between the top end and the bottom end, a collar rim extending along the top end and protruding into the collar opening, and a second set of mechanical features along the at least one collar side wall, the second set of mechanical features being capable of engaging with the first set of mechanical features on the container; and at least one pressure relief valve within the liquid supply assembly, said at least one pressure relief valve being capable of (i) preventing fluid from exiting the liquid supply assembly when a system pressure within said container is less than a threshold amount, and (ii) allowing fluid to exit the liquid supply assembly when the system pressure within said container is greater than or equal to the threshold amount, wherein the container, the lid, the optional shroud, and the optional collar form a pressurizable assembly capable of withstanding a container pressure of at least about 69.0 kiloPascals (kPa) (10 pounds per square inch (psi)).

16. The assembly of claim 15, wherein the collapsible liner comprises a collapsible liner component integrally attached to the container so as to fit within the container.

17. The assembly of claim 15, wherein the shroud further comprises a second set of mechanical features extending along the inner or outer shroud surface proximate the first end of the shroud, the second set of mechanical features being capable of engaging with the first set of mechanical features on the container.

18. The assembly of claim 15, wherein the lid further comprises a second set of mechanical features extending along the second end of the lid opposite the one or more lid components, the second set of mechanical features being capable of engaging with the first set of mechanical features on the container.

19. The assembly of claim 15, further comprising a gasket positioned along the first end of the lid along a lower surface of the lid rim, wherein the gasket is capable of providing a seal between the lid and the container.

* * * * *